United States Patent Office 3,657,210
Patented Apr. 18, 1972

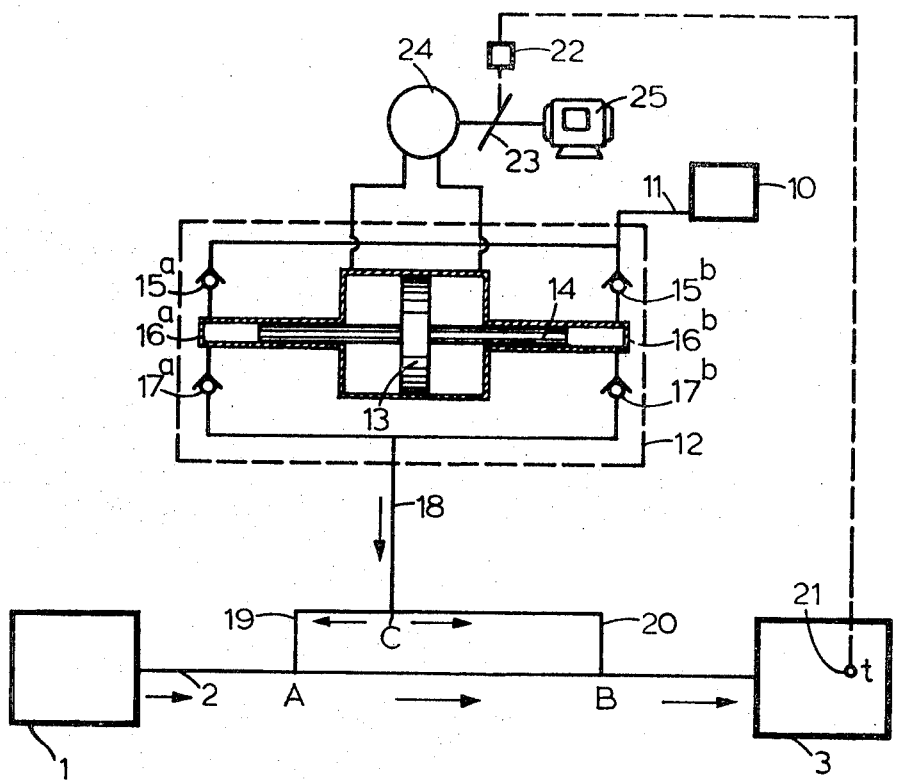

3,657,210
PROCESS FOR CONTROLLING THE INTRODUCTION OF INITIATOR IN THE HIGH-PRESSURE POLYMERIZATION OF ETHYLENE
Jan H. K. Minkhorst, Munstergeleen, Netherlands, assignor to Stamicarbon N.V., Heerlen, Netherlands
Filed Aug. 20, 1970, Ser. No. 65,475
Claims priority, application Netherlands, Aug. 25, 1969, 6912911
Int. Cl. C08f *3/04, 1/60*
U.S. Cl. 260—94.9 P
4 Claims

ABSTRACT OF THE DISCLOSURE

A process for mixing an initiator solution with ethylene under pressure as it travels to a high pressure polymerizer, where the initiator solution is introduced into the ethylene stream at different points and traveling different distances from the initiator source thereby controlling the high-pressure polymerization of ethylene is disclosed.

BACKGROUND OF THE INVENTION

The present invention relates to a process for controlling the high-pressure polymerization of ethylene in which a controlled quantity of an initiator solution together with ethylene is continuously fed into a polymerization zone that is kept under working pressure. Such a process is known and disclosed in U.S. Pat. 3,299,033, the disclosure of which is hereby incorporated by reference. As set forth therein, it is essential, if the chemical and physical properties of the resulting reaction products are to be held at a uniform level, to keep the quantity of initiator solution fed into the reaction zone is conformity with the temperature and pressure conditions prevailing in the reaction zone at the moment of introduction of the ethylene and initiator mixture. According to the above patent, the desired quantity of initiator solution added by means of a double-acting plunger pump to the ethylene flow stream on its way towards the reactor, is controlled by a throttling valve which, placed in the initiator line, is operated, for example, in direct relation to the temperature prevailing in the reactor. However, in order that any variations produced in the initiator flow by pressure fluctuation will be substantially eliminated, the pressure in the initiator line upstream from the throttling valve is kept at a pressure above the normal reactor pressure. In fact, the pressure in the initiator line is so much above the pressure in the reactor that the pressure differential is equal to or larger than the variations in reactor pressure. In operation, pressure pulsations are produced by the plunger pump. To damp these pressure pulsations a valve and a buffer vessel are connected to the initiator line. There remains the possibility that the controlled quantity of liquid is subjected to some instantaneous variation in the volume of liquid injected into the pressure zone.

An object of the present invention is to provide a process for the substantial uniform distribution of an initiator in an ethylene flow, without the initiator flow being impeded by an adjustable throttling valve and thus an improvement over the disclosure of the above patent.

Another object of the invention is to provide a process for controlling the high-pressure polymerization of ethylene, without the necessity of bringing the initiator to a much higher pressure than that of the polymerization reaction.

Another object of the invention is to provide a process in which the pressure pulsations produced by the plunger pump feeding the initiator into the ethylene line are used to good advantage.

DESCRIPTION OF THE INVENTION

The process according to the invention is characterized in that the controlled quantity of initiator solution, before being added to the ethylene, is divided into a number of partial streams, each of which travels different distances before being fed to the ethylene flow at different points of the flow. Preferably, the initiator flow is divided into two partial streams of different lengths, the shorter of which joins the ethylene flow upstream of the point where the longer partial stream is fed into the ethylene flow.

The invention also relates to an apparatus for controlling the high-pressure polymerization of ethylene, which comprises an ethylene compressor, a polymerization reactor, a connecting line between the two and a plunger pump for supplying the initiator along a line to the ethylene line, the apparatus according to the invention being characterized in that the initiator line is bifurcated into two branches of unequal lengths which are connected to the ethylene line so that the amount of time in which the ethylene flows from the first point of connection to one of the initiator lines to the second point of connection of the other initiator line equals half, or an odd multiple of half, the pulsation period of the plunger pump. This may be expressed by the formula $t = \frac{1}{2} \, np$ wherein $n$ is an odd integer and $p$ is the pulsation period.

The degree to which the initiator concentration in the ethylene flow to the high-pressure reactor is influenced by the pulsation produced by the plunger pump feeding the initiator can thus be reduced as much as possible.

Initiators suitable for the polymerization of ethylene at high pressures are of the free radical type, typically a peroxide or oxygen-containing compound, such as lauroyl peroxide, ditertiarybutyl peroxide, tertiarybutyl peracetate, as well as other organic and inorganic peroxides. The abovementioned compounds are preferably dissolved in a solvent, such as a saturated hydrocarbon, or an aromatic hydrocarbon, and or an alcohol and mixtures thereof or the like, thus comprising the initiator solution. Likewise, oxygen gas e.g. as a solution, e.g. in methanol, may be used.

The usual initiators are effective at very low concentrations of the order of 20 parts per million by weight.

It should be noted that U.S. Pat. 3,023,202 discloses a process for the high-pressure polymerization of ethylene in which fresh ethylene plus initiator is first combined with a fluctuating quantity of recycling ethylene. The resulting mixture is divided into a number of streams which are passed through lines of different lengths and subsequently recombined and fed to a reactor. However, the unnecessary lengthening of the ethylene line involves hazards such as decompositions therein.

An example of how the invention may be practiced and an embodiment therefore are shown in the attached drawing, which is a schematic representation of the apparatus. In this figure, compressor 1 is connected with a reactor 3 via an ethylene line 2. During operation, ethylene maintained under pressure of say, approximately 2000 atm., is passed through the line from the compressor to the reactor. A very small quantity of initiator solution should be fed as uniformly as possible into the constant ethylene flow. A vessel 10 is provided for storage of initiator solution. The initiator solution flows along a line 11 to a double-acting plunger pump assembly 12 which is operated by a low-pressure hydraulic system 24 exerting pressure on a large drive piston 13 coupled on either side to a narrow double plunger 14. The ratio of the surface areas of piston and plunger is a measure of the pressure multiplication produced by the pump. The reciprocating pump plunger 14 draws the initiator solution via a set of inlet valves 15a and 15b into the cylinders 16a and 16b and delivers it into the initiator line 18 via set of exhaust valves 17a and 17b. At point C this line bifurcates into two branches 19 and 20, which merge into ethylene line 2 at A and B respectively. The distance AC is shorter than the distance BC. The section of lines AC and BC have a sufficiently small diameter (e.g. ⅛"), that no additional constrictions therein are needed thus in consequence, the pressure drop in the main line between A and B has virtually no effect on the distribution of the two initiator flows.

Therefore, if during operation, ethylene is flowing through line 2 from compressor 1 to reactor 3, and the pressure at A equals, for example, 2001 atm., then the pressure at B equals, for example, 1999 atm. Also under the same conditions, the pressure in initiator line 18 at point C is, for example, 2010 atm. The pressure drop over the section 19 is consequently 9 atm. and that over the section 20 is 11 atm. Pressures of about 2000 atm. in the reaction zone are commonly used in the high-pressure polymerization of ethylene, although lower and higher pressures of the order of about 500 to 3000 atm. may be used. Thus it is apparent that the pressure in line 18 is at least in slight excess to the pressure of ethylene line 2.

The temperature of the high pressure polymerization reaction is from about 140° C. to about 320° C.

During operation, the double-acting plunger pump line maintains a flow of initiator to ethylene line 2. The initiator flow in line 18 is not uniform, but subject to certain pulsations as a result of:

(a) the slow-down and reversal of the plunger travel near the dead centers,
(b) the compressibility of the initiator solution under the high pressures employed (approx. 20–30% at 2000 atm.) and
(c) the characteristics of the non-return valves 15a and 15b, and 17a and 17b.

The distance between the connecting points A and B is of sufficient length such that a a nominal through-flow rate, the time needed for the ethylene to travel from A to B is half or an odd multiple of half the pulsation period. This period of time may be expressed by the formula: $t = ½ \, np$ wherein $n$ is an odd integer and $p$ is the pulsation period.

The invention offers several important advantages over those of the prior art: the initiator consumption is lower than that in other known methods because the supply thereof is accomplished at a more uniform rate. The ethylene feed line to which the initiator is added between compressor and reactor may be shorter, which adds to its lifetime and, furthermore, decreases the decomposition hazard in the line.

The quantity of initiator supplied to the ethylene feed line can be controlled by varying the stroke of piston 13 of pump assembly 12. In practice, control of the quantity of initiator in relation to the reaction temperature is achieved by means of a thermocouple 21 which indicates the highest temperature in the polymerization reactor and subsequently activates a pneumatic transmitter 22 which changes the position of swash plate 23 to the hydraulic pump assembly 24 which is powered by electromotor 25.

What is claimed is:

1. Process for controlling the high-pressure polymerization of ethylene in which a controlled quantity of a free-radical initiator in solution together with ethylene is continuously fed into a polymerization zone maintained at a pressure of at least about 500 atm., the improvement wherein said quantity of initiator solution is divided into two partial streams which travel different distances before being introduced into the ethylene flow at different points thereof, the length of the initiator stream emerging at the first point of connection into the ethylene flow is shorter than the length of the initiator stream emerging downstream from said first point and the time ($t$) required by the ethylene to flow from the first point of introduction of initiator solution to the second point of introduction is represented by the formula $t = ½ \, np$, wherein $n$ is an odd integer and $p$ is the pulsation period of the plunger pump.

2. Process as claimed in claim 1 wherein the quantity of initiator solution is controlled in relation to the temperature in the polymerization zone.

3. Process as claimed in claim 1 wherein said free initiator is a peroxy-compound.

4. Process as claimed in claim 3 wherein said peroxy-compound is selected from the class consisting of lauroyl peroxide, ditertiary-butyl peroxide and tertiarybutyl peracetate.

References Cited
UNITED STATES PATENTS

| | | | |
|---|---|---|---|
| 3,334,081 | 8/1967 | Madgwick et al. | 260—94.9 R |
| 3,399,185 | 8/1968 | Schappert | 260—94.9 R |
| 3,405,115 | 10/1968 | Schappert et al. | 260—94.9 R |
| 3,546,189 | 12/1970 | Rätzsch et al. | 260—94.9 R |
| 3,023,202 | 2/1962 | Schappert | 260—94.9 P |
| 3,299,033 | 1/1967 | Douglas | 260—94.9 |

JOSEPH L. SCHOFER, Primary Examiner

A. HOLLER, Assistant Examiner

U.S. Cl. X.R.

260—94.9 R